(12) United States Patent
Darrow (10) Patent No.: US 11,022,687 B2
(45) Date of Patent: Jun. 1, 2021

(54) WADING STAFF WITH A SONAR TRANSDUCER

(71) Applicant: NAVICO HOLDING AS, Egersund (NO)

(72) Inventor: Ryan M. Darrow, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 320 days.

(21) Appl. No.: 16/354,315

(22) Filed: Mar. 15, 2019

(65) Prior Publication Data

US 2020/0292701 A1    Sep. 17, 2020

(51) Int. Cl.
| | |
|---|---|
| *G01S 15/96* | (2006.01) |
| *G01S 15/89* | (2006.01) |
| *G01S 7/52* | (2006.01) |
| *A45B 3/08* | (2006.01) |
| *A45B 9/04* | (2006.01) |
| *A45B 9/00* | (2006.01) |

(52) U.S. Cl.
CPC ............ *G01S 15/96* (2013.01); *A45B 3/08* (2013.01); *A45B 9/04* (2013.01); *G01S 7/52055* (2013.01); *G01S 7/52084* (2013.01); *G01S 15/8938* (2013.01); *A45B 2009/002* (2013.01)

(58) Field of Classification Search
CPC .. G01S 15/96; G01S 7/52084; G01S 7/52055; G01S 15/8938; G01S 7/6245; G01S 15/89; A45B 3/08; A45B 9/04; A45B 2009/002; A45F 3/44
See application file for complete search history.

(56) References Cited

U.S. PATENT DOCUMENTS

| | | | | |
|---|---|---|---|---|
| 2,496,639 A | * | 2/1950 | Richardt, Jr. ........... | G01S 15/88 367/116 |
| 3,546,467 A | * | 12/1970 | Benham ................. | A61H 3/068 250/215 |
| 5,495,689 A | * | 3/1996 | Cassem .................. | A01K 97/00 367/107 |

(Continued)

OTHER PUBLICATIONS

"The iCane Smart Walking Stick;" May 5, 2017; retrieved Mar. 20, 2019 from https://www.ideaconnection.com/new-inventions/the-icane-smart-walking-stick-11865.html.

(Continued)

*Primary Examiner* — Daniel Pihulic
(74) *Attorney, Agent, or Firm* — Nelson Mullins Riley & Scarborough LLP (57) ABSTRACT

A wading staff is provided herein that is configured to provide stability for an angler that is standing in a body of water. The wading staff includes a staff portion defining a first end and a second end, a handle disposed proximate the first end of the staff portion, and a sonar transducer disposed at least partially within the staff portion. The sonar transducer is configured to transmit a sonar beam into an underwater environment. The sonar transducer is positioned and oriented within the staff portion such that the sonar transducer is configured to transmit the sonar beam into a portion of the underwater environment when the staff is at least partially submerged. A display may be mounted to the wading staff or located remotely to display corresponding sonar images.

20 Claims, 9 Drawing Sheets

(56) References Cited

U.S. PATENT DOCUMENTS

| | | | | |
|---|---|---|---|---|
| 6,226,227 B1* | 5/2001 | Lent | ............... | G01S 7/6236 |
| | | | | 367/104 |
| 7,778,112 B2* | 8/2010 | Behm | ............... | G01S 15/93 |
| | | | | 367/116 |
| 2018/0079476 A1* | 3/2018 | Abdellatif | ............ | B63G 8/39 |
| 2020/0292701 A1* | 9/2020 | Darrow | ............ | G01S 7/52055 |

OTHER PUBLICATIONS

"Fishin' Buddy MAX;" *Humminbird*; retrieved Mar. 20, 2019 from https://humminbird.johnsonoutdoors.com/fish-finders/fishin-buddy/fishin-buddy-max.

"360 Imaging—Minn Kota Ultrex Trolling Motor Mount;" *Humminbird*; retrieved Mar. 20, 2019 from https://humminbird.johnsonoutdoors.com/accessories/360-imaging/360-imaging-minn-kota-ultrex-trolling-motor-mount.

\* cited by examiner

WADING STAFF WITH A SONAR TRANSDUCER

FIELD OF THE INVENTION

Embodiments of the present invention relate generally to wading staffs and, more particularly, to systems, assemblies, and associated methods for providing a wading staff with a sonar transducer.

BACKGROUND OF THE INVENTION

A common tool utilized by shallow water fisherman is a wading staff. The wading staff provides an additional point of contact with the bottom of a body of water, thereby providing additional stability. The additional support provided by the wading staff may be especially desirable when the fisherman is wading in moving water, such as a river or stream, and/or navigating an uneven or slippery bottom surface. Some wading staffs may be a solid (non-collapsible) structure, whereas others may be collapsible, such as for easy storage and transport.

BRIEF SUMMARY OF THE INVENTION

Generally, shallow water fisherman wade into a body of water to fish while partially submerged. Since the fisherman is not utilizing a watercraft, many of the common fishing aids associated with watercraft fishing, such as sonar, are not available.

Shallow water fisherman may utilize a wading staff to improve their stability and safety while traversing or wading in a body of water. In an example embodiment, a wading staff is provided that includes a sonar transducer incorporated into the wading staff. Sonar returns from sonar signals transmitted into the body of water may be used to generate sonar images of the underwater environment, which may be displayed on a user interface (e.g., either attached to the staff or located remotely (such as the fisherman's mobile device)).

In some example embodiments, the user interface may be integral to the wading staff, such as affixed or mounted to a grip portion of the wading staff. Additionally or alternatively, in some example embodiments, the user interface may be a portion of a remote computing device, such as a smart phone or tablet computer. In such a case, the wading staff may transmit the sonar image data to the remote computing device for display on the user interface.

In some example embodiments, the wading staff may include one or more environmental sensors configured to measure one or more environmental conditions, such as water temperature, current, oxygen content, or the like.

In an example embodiment, the wading staff may include a tip configured to penetrate the bottom surface of the body or water to improve stability. In some example embodiments, the tip may include a depth limiter to prevent the tip from being inserted beyond a predetermined depth.

An example embodiment of the present invention includes a wading staff configured to provide stability for an angler that is standing in a body of water. The wading staff comprises a staff portion defining a first end and a second end. The wading staff further includes a handle disposed proximate the first end of the staff portion. The wading staff further includes a sonar transducer attached to the staff portion proximate the second end. The sonar transducer is configured to transmit a sonar beam into an underwater environment. The sonar transducer is positioned and oriented within the staff portion such that the sonar transducer is configured to transmit the sonar beam into a portion of the underwater environment when the staff is at least partially submerged.

In some embodiments, the wading staff further comprises a user interface positioned proximate the first end of the staff portion, a processor, and a memory including computer program code. The computer program code is configured to, when executed by the processor, cause the wading staff to receive sonar data from the sonar transducer; generate one or more sonar images based on the sonar data; and cause the one or more sonar images to be displayed on the user interface. In some embodiments, the one or more sonar images comprise two dimensional sonar images. In some embodiments, the sonar transducer comprises a transducer array configured to transmit a plurality of sonar beams into the underwater environment, and the one or more sonar images comprise three dimensional sonar images.

In some embodiments, the wading staff further comprises a processor and a memory including computer program code. The computer program code is configured to, when executed by the processor, cause the wading staff to receive sonar data from the sonar transducer; generate one or more sonar images based on the sonar data; and cause the one or more sonar images to be transmitted to a remote computing device and displayed on a display associated with the remote computing device. In some embodiments, the sonar images comprise two dimensional sonar images. In some embodiments, the sonar transducer comprises a transducer array configured to transmit a plurality of sonar beams into the underwater environment, and the one or more sonar images comprise three dimensional sonar images.

In some embodiments, the wading staff further comprises one or more environmental sensors disposed in the shaft portion. The one or more environmental sensors are configured to measure one or more environmental conditions of the body of water when the staff is at least partially submerged.

In some embodiments, the wading staff further comprises a tip disposed at the second end of the staff portion and configured to penetrate a bottom surface of the body of water. In some embodiments, the wading staff further comprises a depth limiter disposed proximate the tip and extending radially from a central axis of the staff portion to prevent the staff from being inserted into the bottom surface past the depth limiter.

In some embodiments, the wading staff further comprises one or more control interfaces disposed on the handle.

In some embodiments, the staff comprises a watertight housing with respect to the sonar transducer.

In some embodiments, the sonar transducer is disposed at least partially within the staff portion.

In some embodiments, the sonar transducer is movably attached to the staff portion. The sonar transducer is movable between a first position and a second position along a longitudinal dimension of the staff portion, wherein the longitudinal dimension is defined between the first end and the second end.

In another example embodiment a wading staff is provided. The wading staff configured to provide stability for an angler that is standing in a body of water. The wading staff comprises a staff portion defining a first end and a second end. The wading staff includes a handle disposed proximate the first end of the staff portion. The wading staff further includes a sonar transducer at least one of attached to or disposed at least partially within the staff portion. The sonar transducer is configured to transmit a sonar beam into an underwater environment. The sonar transducer is positioned and oriented within the staff portion such that the sonar transducer is configured to transmit the sonar beam into a portion of the underwater environment when the staff is at least partially submerged. The wading staff further includes a user interface positioned proximate the first end of the staff portion, a processor, and a memory including computer program code. The computer program code is configured to, when executed by the processor, cause the wading staff to receive sonar data from the sonar transducer; generate one or more sonar images based on the sonar data; and cause the one or more sonar images to be displayed on the user interface.

In some embodiments, the one or more sonar images comprise two dimensional sonar images.

In some embodiments, the sonar transducer comprises a transducer array configured to transmit a plurality of sonar beams into the underwater environment, and the one or more sonar images comprise three dimensional sonar images.

In some embodiments, the sonar transducer is movable between a first position and a second position along a longitudinal dimension of the staff portion. The longitudinal dimension is defined between the first end and the second end.

In yet another example embodiment, a method for manufacturing a wading staff is provided. The wading staff is configured to provide stability for an angler that is standing in a body of water. The method comprises providing a staff portion defining a first end and a second end and attaching a handle to the staff portion proximate the first end of the staff portion. The method further includes attaching a sonar transducer to the staff portion. The sonar transducer is configured to transmit a sonar beam into an underwater environment. The sonar transducer is positioned and oriented within the staff portion such that the sonar transducer is configured to transmit the sonar beam into a portion of the underwater environment when the staff is at least partially submerged. The method further includes attaching a user interface to the staff portion proximate the first end of the staff portion. The method further includes installing a processor within the staff portion and installing a memory within the staff portion. The memory includes computer program code configured to, when executed by the processor, cause the wading staff to receive sonar data from the sonar transducer; generate one or more sonar images based on the sonar data; and cause the one or more sonar images to be displayed on the user interface.

In some embodiments, the method further comprises installing one or more environmental sensors within the shaft portion, wherein the one or more environmental sensors are configured to measure one or more environmental conditions of the body of water when the staff is at least partially submerged.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Some embodiments of the present invention provide a wading staff including a sonar transducer. The wading staff may generate one or more sonar images based on sonar returns received by the sonar transducer and present the sonar images to a fisherman. The sonar images may provide the fisherman with useful visual information regarding the underwater environment.

Figure 1:
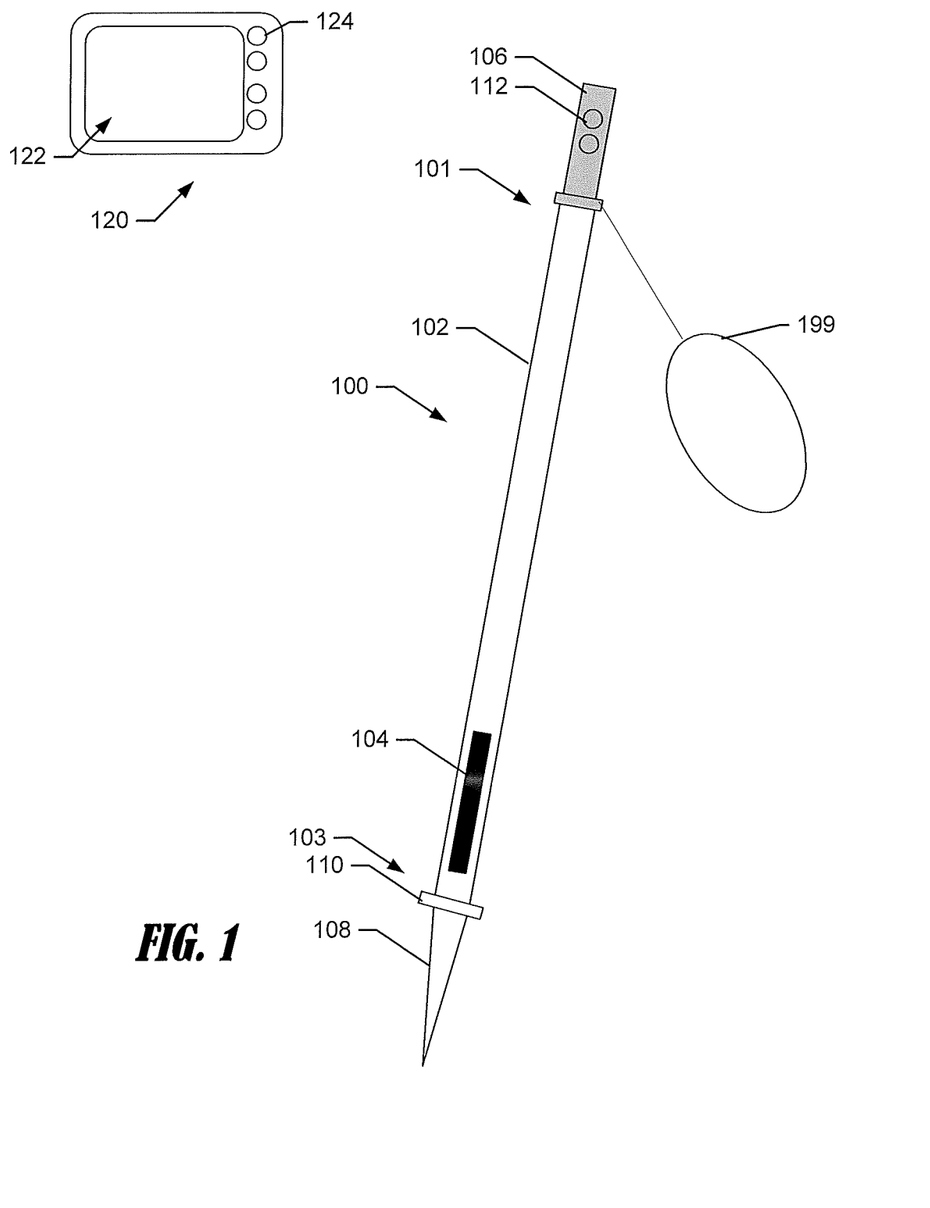
FIG. 1 illustrates an example wading staff and remote computing device, in accordance with some embodiments discussed herein.

FIG. 1 illustrates an example wading staff 100. The wading staff 100 may include a staff portion 102 defining a first end 101 and a second end 103. The staff portion 102 may be formed from plastic, metal, or other suitable material. In some example embodiments, the staff portion 102 may be hollow, which may reduce material costs and weight. In some example embodiments, the staff portion 102 may be a continuous structure. In some example embodiments, the staff portion 102 may include multiple sections that may telescope into one another, rotate/fold relative to each other, and/or screw together, such that the staff may be transitioned between a utility configuration and a storage configuration.

In some example embodiments, the wading staff 100 may include one or more sonar transducers or transducer assemblies 104 disposed in the staff portion 102 (e.g., proximate the second end 103). The transducer assemblies 104 may each include one or more transducer elements configured to transmit sound waves into a body of water, receive sonar return signals from the body of water, and convert the sonar return signals into sonar return data.

Figure 3:
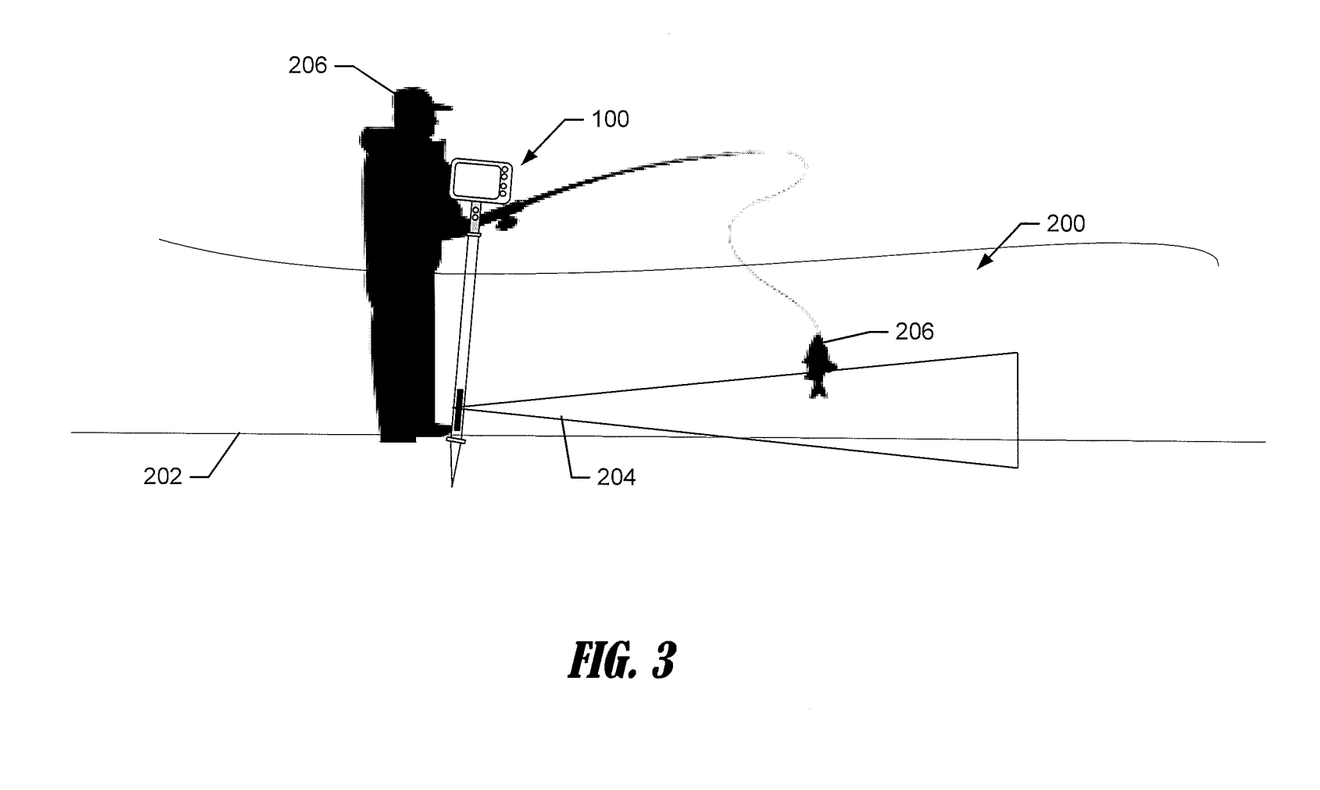
FIG. 3 illustrates an example deployment of a wading staff in a shallow water fishing environment, in accordance with some embodiments discussed herein.

Referring also to FIG. 3, one or more sonar beams 204 may be generated by the one or more transducer assemblies 104 when deployed in a body of water 200. In some instances, a plurality of transducer elements may be embodied in a transducer assembly. In some embodiments, the transducer assembly may include one or more elements with a designated shape (e.g., a conical transducer element, a bar (e.g., linear, elongated rectangle, or the like) transducer element, or square-shaped transducer element), which may be housed within a transducer housing. In some example embodiments, the transducer assembly may be a transducer array, e.g. a "phased array." In some embodiments, the transducer array may include a plurality of transducer elements arranged on a printed circuit board (PCB). The PCB may mechanically support and electrically connect the electronic components, including the transducer elements using conductive tracks (e.g. traces), pads, and other features. The conductive tracks may comprise sets of traces, for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g. sonar beams 204, into the body of water 200. When the sound waves of the sonar beams strike anything of differing acoustic impedance (e.g., the sea floor or something suspended in the water above the bottom, such as a fish 206), the sound waves reflect off that object. These echoes (or sonar return signals) may strike the transmitting transducer element and/or a separate one or more sonar receiver elements, which convert the echoes back into an electrical signal that is processed by a processor (e.g., processing circuity 407, 407' as discussed in reference to FIGS. 4 and 5) and sent to a display (e.g., an LCD) mounted on the staff or remote from the staff. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to produce a sonar image representing the underwater environment.

In some example embodiments, the one or more transducer assemblies 104 may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer arrays or transducer elements may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a three-dimensional position of the sonar return signals (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. Pat. No. 10,114,119, entitled "Sonar Systems using Interferometry and/or Beamforming for 3D Imaging", and U.S. Pat. No. 9,739,884, entitled "Systems and Associated Methods for Producing a 3D Sonar Image," both of which are assigned to the Assignee of the present application and are hereby incorporated by reference herein in their entireties.

Returning to FIG. 1, a handle 106 may be disposed at the first end 101 of the staff portion 102. The handle 106 may be formed from plastic, rubber, or other suitable material. The material of the handle 106 may be selected to provide grip in wet environments to prevent loss of the wading staff 100 and/or slipping of the user's hand grip. In some embodiments, the wading staff may include a lanyard 199 that may be attached to the wrist or body of the user, such that the wading staff 100 may be easily recovered if the user inadvertently releases the grip 106. In some example embodiments, the handle 106 may be contoured for a hand of the user.

A stake or tip 108 may be disposed at the second end 103 of the staff portion 102. Referring again to FIG. 3, the tip 108 may be configured to penetrate the bottom surface 202 of the body of water 200. Penetration of the tip 108 into the bottom surface 202 of the body of water 200 may provide additional stability to the wading staff 100 as a fisherman traverses the body of water 200. In some example embodiments, with reference to FIGS. 1 and 3, the wading staff 100 may also include a depth limiter 110 disposed proximate the tip 108 and extending radially from a central axis of the staff portion 102 to prevent the staff portion 102 from being inserted into the bottom surface 202 past the depth limiter 110.

In some embodiments, the wading staff may be associated with display assembly 120 including a user interface 122. The display assembly 120 may be a remote computing device, such as a smart phone or tablet computer, as depicted in FIG. 1. In an example embodiment, the remote computing device may be in data communication with the wading staff 100 via a wired or wireless connection.

Figure 2A:
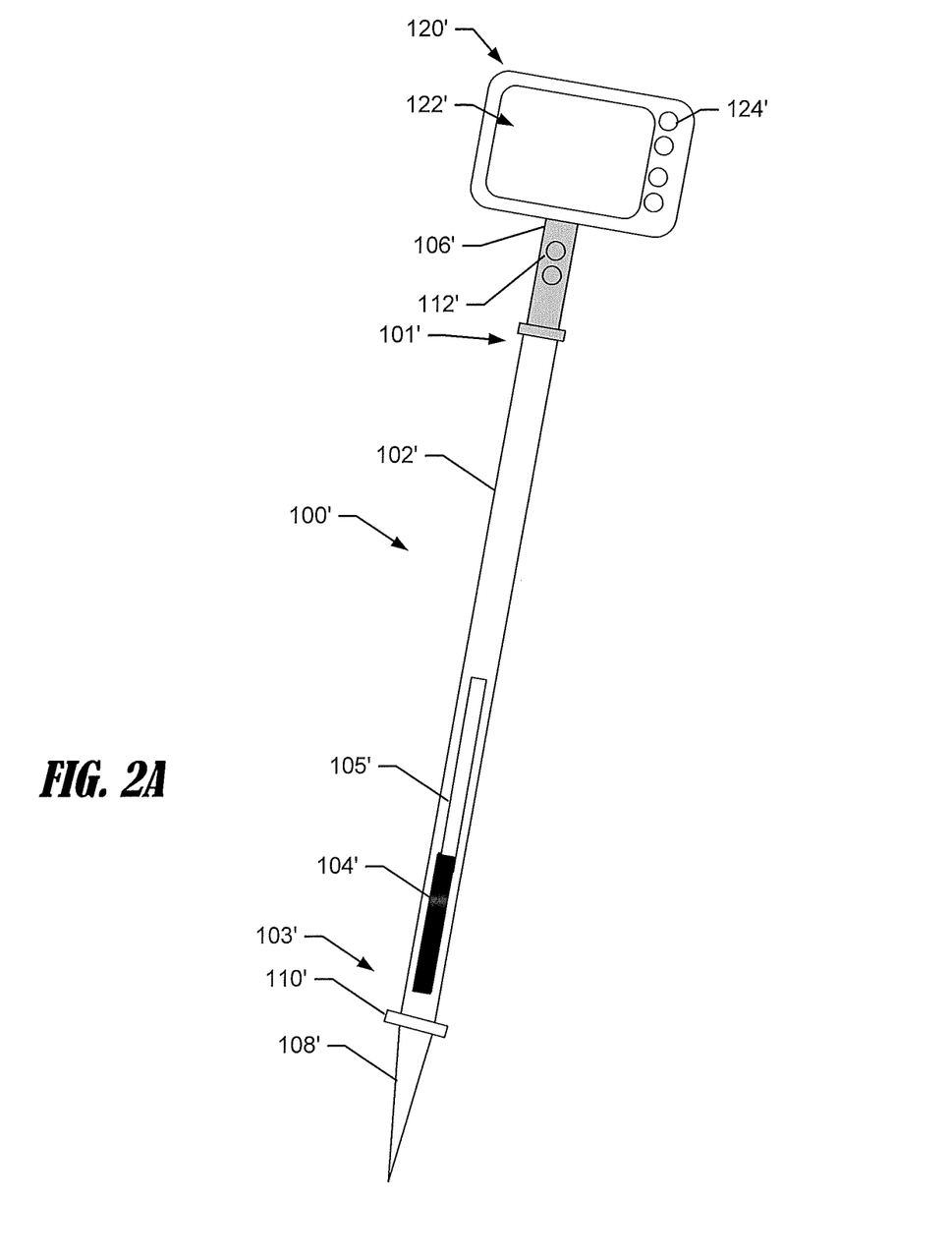
FIG. 2A illustrates an example wading staff with an attached display assembly, where the sonar transducer is in a first position, in accordance with some embodiments discussed herein.
Figure 2B:
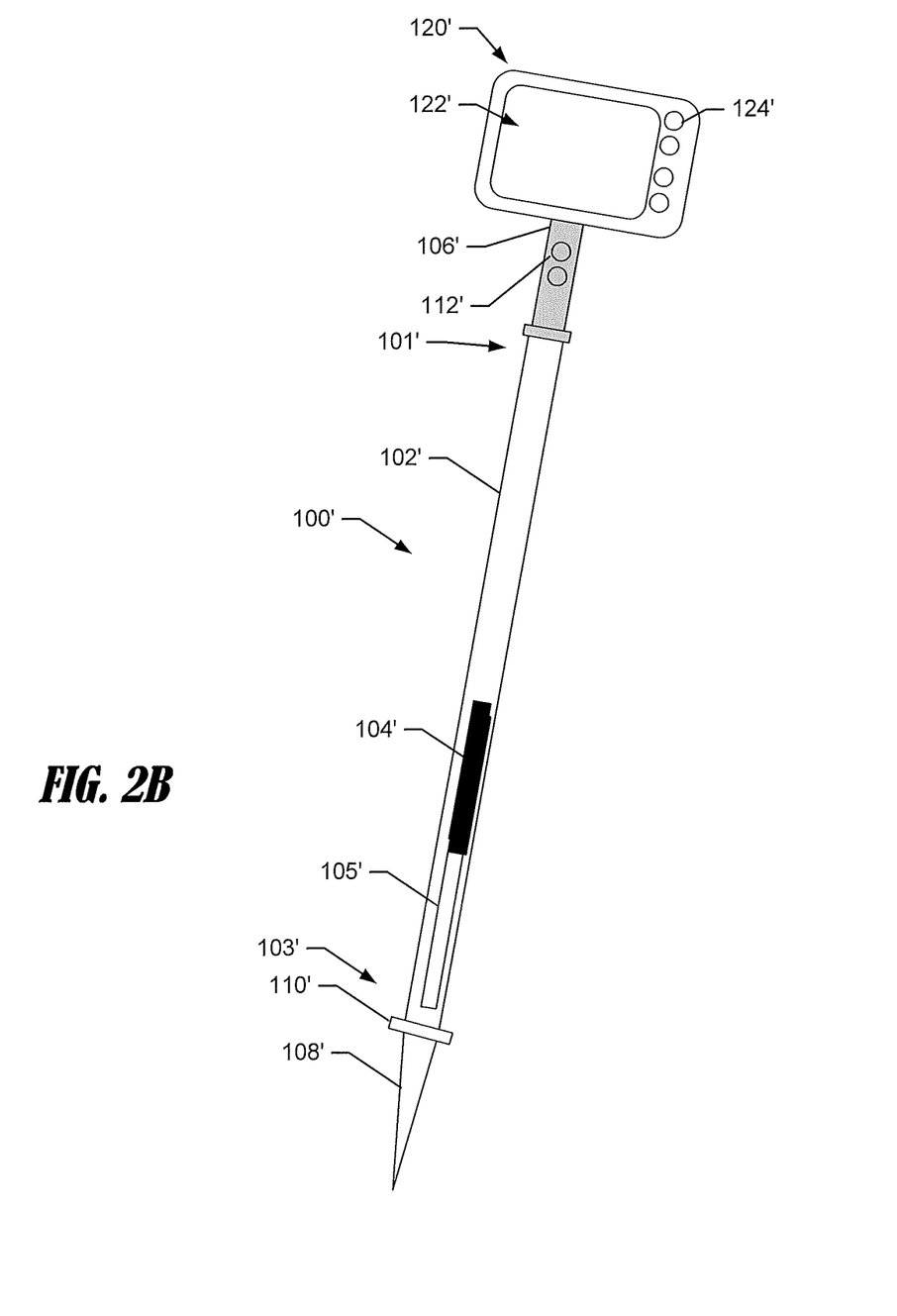
FIG. 2B illustrates the example wading staff in FIG. 2A, where the sonar transducer is in a second position, in accordance with some embodiments discussed herein.

Alternatively, with reference to FIGS. 2A and 2B, the display assembly 120' may be attached to and/or integral with the wading staff 100', such as mounted to the handle 106' or staff portion 102'. In some embodiments, the handle 106' may include a mounting to attach a remote computing device to the handle 106'. In some such embodiments, the display assembly 120' may communicate with the wading staff, e.g., the processor, via a wired or wireless connection.

In some embodiments, the handle 106 may include one or more control interfaces 112, such as power buttons, selection buttons, touch pads, or the like. Additionally or alternatively, the display assembly 120 may include one or more control interfaces 124, such as power buttons, selection buttons, touch pads, touchscreens, or the like, which may control operations of the display assembly, the wading staff 100, or both.

In some example embodiments, the wading staff 100 may include one or more environmental sensors, discussed in further detail below in reference to FIGS. 4 and 5. The one or more environmental sensors may be configured to measure one or more environmental conditions of the body of water 200 when the staff portion 102 is at least partially submerged. The one or more environmental sensors may include, without limitation, a water temperature sensor, a water current sensor, a light sensor, an oxygen sensor, or the like.

In operation, the user may turn on the wading staff 100 using the control interface 112 of the handle 106 or the control interface 124 of the display assembly 120. The user may select or turn on the sonar transducer 104 and/or one or more of the environmental sensors. Processing circuitry associated with the wading staff 100, discussed in further detail in reference to FIGS. 4 and 5, may receive sonar return data from the sonar transducer 104 and generate one or more sonar images based on the sonar data. The processing circuitry may then cause the one or more sonar images to be transmitted to the display assembly 120 to be displayed on a display 122 of the display assembly 120.

Figure 7:
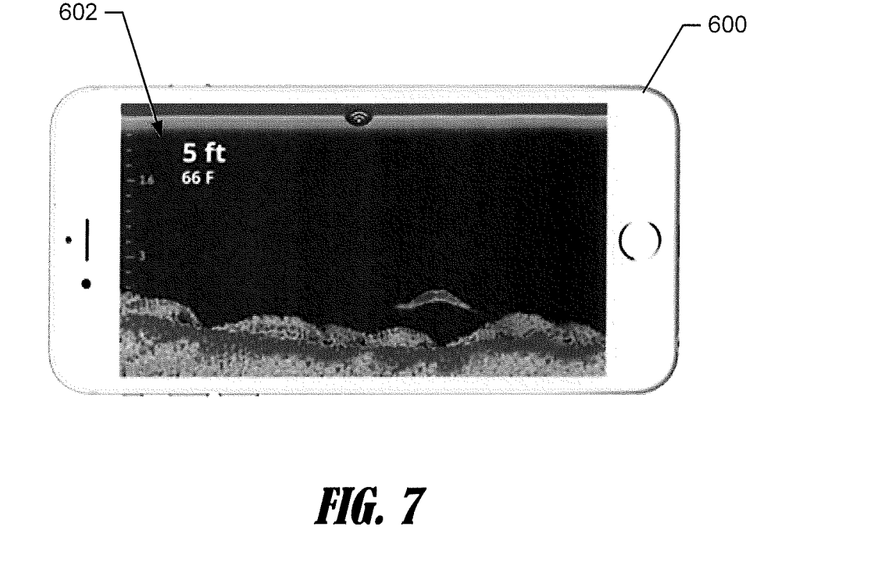
FIG. 7 illustrates an example two dimensional sonar image displayed on a remote computing device, in accordance with some embodiments discussed herein.
Figure 8:
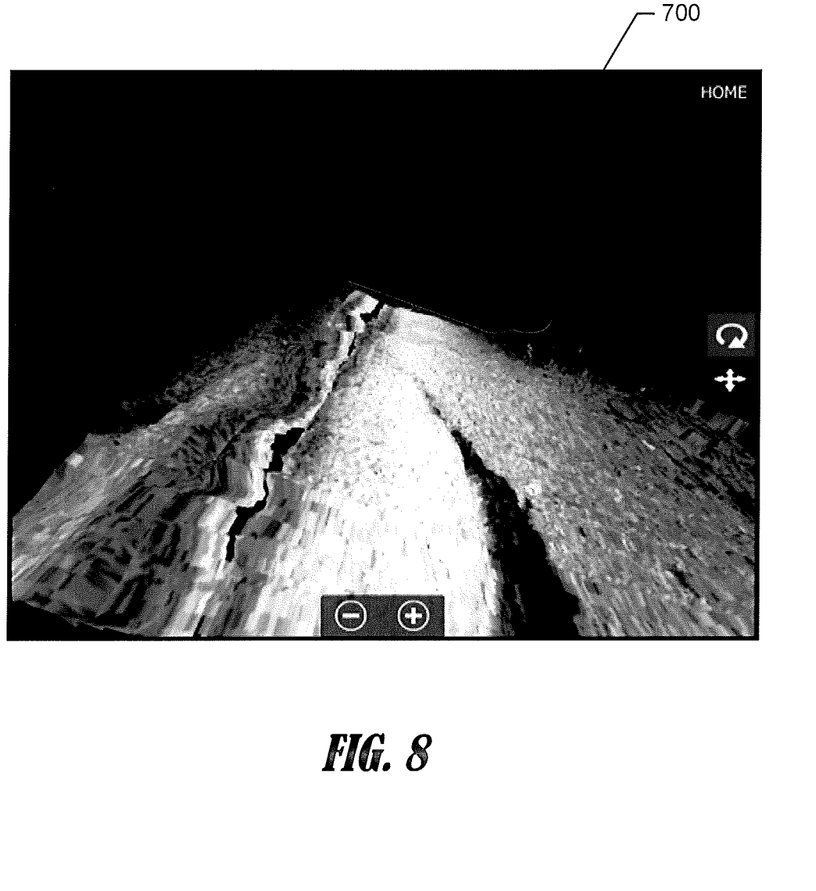
FIG. 8 illustrates an example three dimensional sonar image, in accordance with some embodiments discussed herein.

FIG. 7 depicts a two dimensional sonar image 602 displayed on a remote computing device 600, more particularly a smartphone. In some embodiments, the two dimensional sonar image may be a live sonar image such that the entire picture is constantly updated, which may be particularly beneficial for a fisherman fishing in shallow running water. Notably, while shown on a remote computing device, in some embodiments, such example sonar images could be displayed on an attached user interface. FIG. 8 depicts an example three dimensional sonar image 700 which can be displayed on the various user interfaces described herein. In addition to the sonar data, the processing circuitry may also receive sensor data from the one or more environmental sensors and cause at least a portion of the sensor data to be displayed on the various user interfaces described herein.

In some embodiments, the sonar transducer 104 may be attached to the outside of the staff portion 102, such as through one or more clamps, screws, or other connection features. In other embodiments, the sonar transducer 104 may be disposed at least partially within the staff portion 102 such that it may, in some cases, be integral with the staff portion 102.

In some embodiments, the sonar transducer may be movably attached (e.g., attached to the outside, disposed within, etc.) to the staff portion such that it is movable between at least two positions (e.g., a plurality of positions is contemplated). In some embodiments, the sonar transducer is movable between a first position and a second position along a longitudinal dimension of the staff portion, wherein the longitudinal dimension is defined between the first end and the second end. In such a regard, the sonar transducer may be positioned by the user at a preferred height relative to the bottom of the body of water. Such a feature may be beneficial for shallow water fishing, as the depth of the water varies greatly and the desired depth of the received sonar data may vary accordingly. An example embodiment is depicted in FIGS. 2A and 2B. In this regard, the sonar transducer 104' of the wading staff 100' is movable (e.g., slidable) within a slot 105' between a first position closer to the second end 103' (shown in FIG. 2A) and a second position relatively closer to the first end 101' (shown in FIG. 2B).

Example System Architecture

Figure 4:
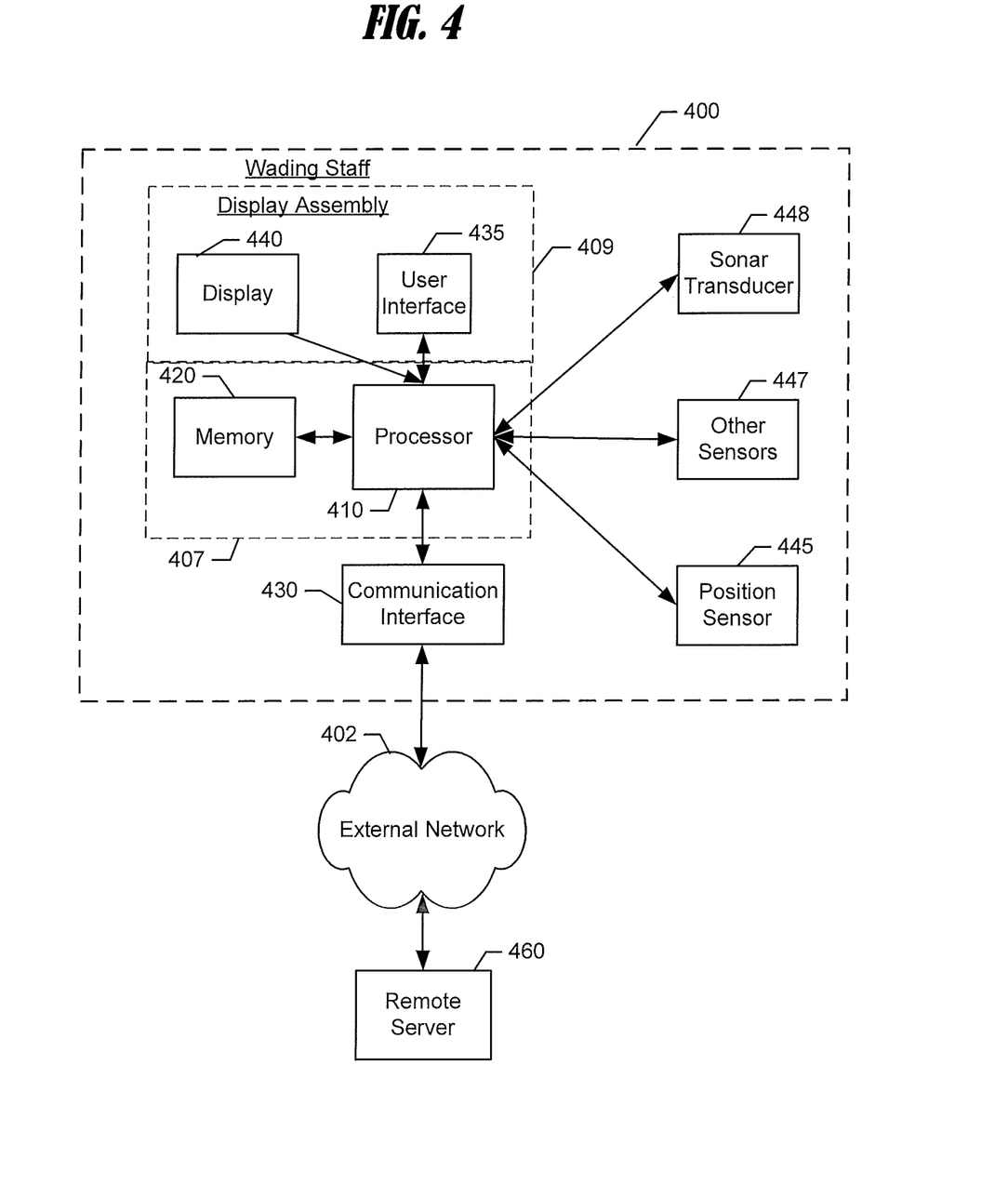
FIGS. 4 and 5 show block diagrams illustrating example wading staff systems, in accordance with some embodiments discussed herein.
Figure 5:
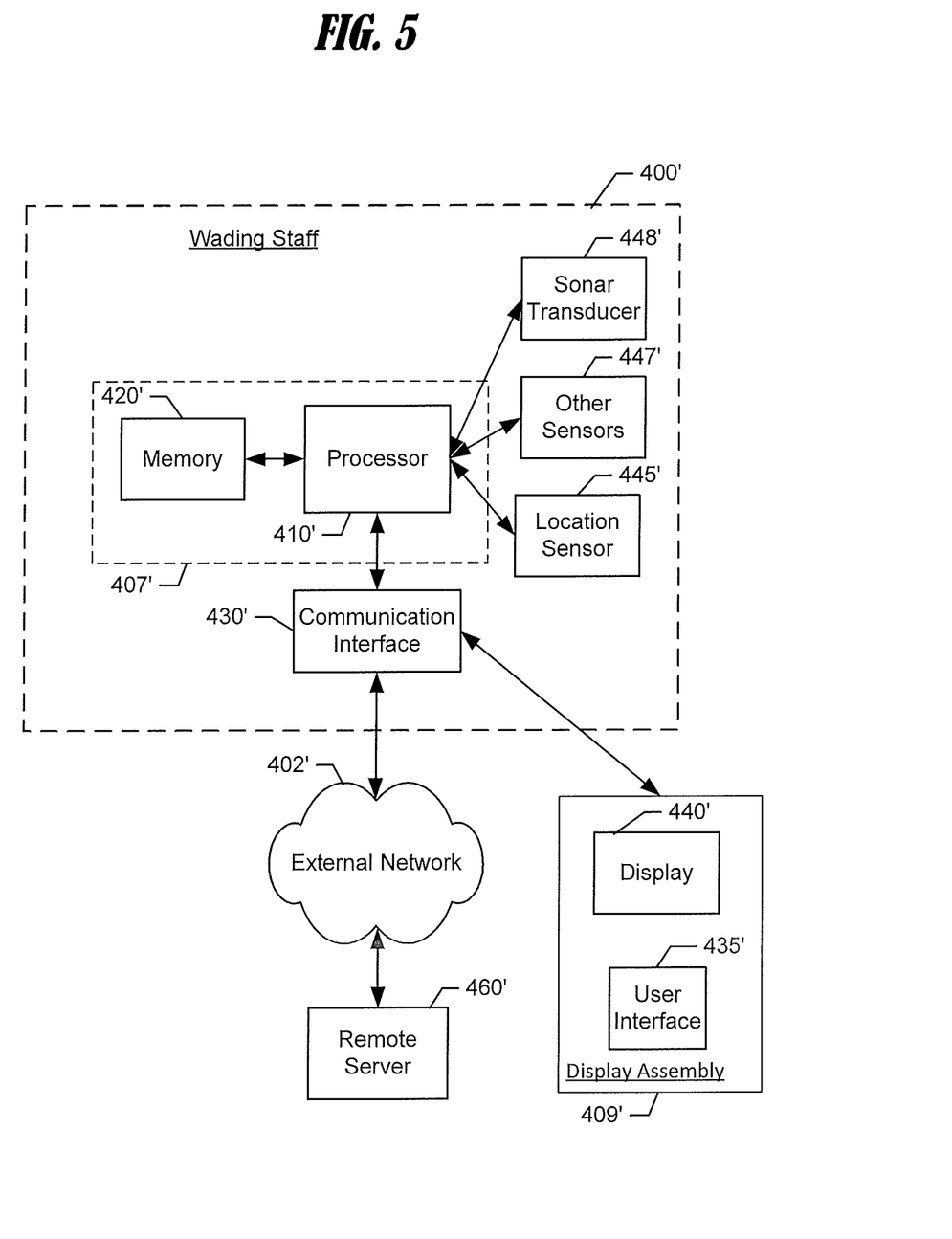

FIGS. 4 and 5 show a block diagrams of example wading staffs 400, 400' capable for use with several embodiments of the present invention. With reference to FIG. 4, as shown, the wading staff 400 may include a number of different modules or components, each of which may comprise any device or means embodied in either hardware, software, or a combination of hardware and software configured to perform one or more corresponding functions. For example, the wading staff 400 may include an attached display assembly 409 as depicted in FIG. 4. Additionally or alternatively, the display assembly 409 may be remote from the wading staff 400, such as embodied in a remote computing device, such as a smart phone, tablet computer or the like. FIG. 5 depicts an example wading staff 400' that does not include an attached display assembly as, instead, the display assembly 409' is remotely located from the wading staff 400'. However, the same components/features of the wading staff 400 in FIG. 4 are also otherwise found in the system shown in FIG. 5.

The wading staff 400 may include one or more communications modules configured to communicate in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, compass, weather service, etc.

The wading staff 400 may include a processor 410, a memory 420, one or more sensors (e.g., position sensor 445, other sensors 447, etc.), a display assembly 409, a communication interface 430, and a sonar transducer 448 (e.g., a transducer assembly as described herein). The display assembly 409 may include a user interface 435 and a display 440.

The processor 410 and memory 420 may form processing circuitry 407. The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide marine data for utilization in various embodiments described herein. For example, the processor 410 may be configured to receive user input associated with sonar data and generate a sonar image to display to a user on the display assembly 409 (e.g. on display 440/user interface 435).

In some embodiments, the processor 410 may be further configured to implement signal processing or enhancement features to improve the display characteristics or data or images, collect or process additional data, such as time, temperature, GPS information, or others, or may filter extraneous data to better analyze the collected data. It may further implement notices and alarms, such as those determined or adjusted by a user, to reflect depth, presence of fish, or the like.

The memory 420 may be configured to store instructions, computer program code, marine data, such as sonar data, chart data, location/position data, and/or other data associated with the wading staff in a non-transitory computer readable medium for use, such as by the processor.

The communication interface 430 may be configured to enable connection to external systems (e.g. an external network 402). In this manner, the wading staff 400 may retrieve stored data from a remote, external server 460 via the external network 402 in addition to or as an alternative to the onboard memory 420. Additionally, the communication interface may be configured to establish wired data communication or wireless data communication, such as Bluetooth, with the display assembly 409 in embodiments in which the display assembly is not attached or integrated into the wading staff. The wireless data communication may be established based on user input or may be automatic such that the wading staff 400 and display assembly 409 are automatically "paired".

The position sensor 445 may be configured to determine the current position/location and/or orientation of the wading staff 400. For example, the location sensor 445 may comprise a GPS, inertial navigation system, such as micro electro-mechanical sensor (MEMS), cellular triangulation, or the like, or other location detection system. In some embodiments, the position sensor 445 may be configured to determine the orientation of the sonar transducer(s) 448, such as to enable directional display or direction indication of a resulting sonar image to aid a user in determining the relative direction corresponding to the sonar images being displayed.

The display 440 may be configured to display images and may include or otherwise be in communication with a user interface 435 configured to receive an input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, weather data, location data, position data, orientation data, sonar data, or any other type of information relevant to the user. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route (a travel path of the wading staff) may be applied to (or overlaid onto) a chart (e.g. a map or navigation chart). Additionally or alternatively, depth information, weather information, sonar information, or any other information may be applied to one another.

The user interface 435 may include, for example, a keyboard, keypad, function keys, mouse, scrolling device, input/output ports, touch screen, or any other mechanism by which a user may interface with the system.

As discussed above, although the display assembly 409, including the user interface 435 and display 440 of FIG. 4, is shown as being directly connected to the processor 410 and integral the wading staff 400, the display assembly 409' could alternatively be remote from the processor 410' and/or wading staff 400', as depicted in FIG. 5.

In some example embodiments, the user interface 435 may be distributed between the wading staff 400 and the display assembly 409. For example, one or more control interfaces may be disposed on the display assembly 409 in associated with the display 440 and one or more control interfaces may be disposed on the wading staff 400, such as in association with the handle.

The wading staff 400 may include one or more other sensors 447. In some embodiments, the other sensors 447 may be condition parameter sensors configured to measure environmental condition parameters. The condition parameter sensors may include, for example, an air temperature sensor, a water temperature sensor, a current sensor, a light sensor, a wind sensor, an oxygen sensor, or the like. The environmental parameters may be associated with collected sonar data and/or user input, such as fishing logs, e.g. fishing data. In some example embodiments, the fishing data or other marine data may be transmitted, via the network 402 to the remote server 460 for later use and analysis.

The sonar transducer 448 (e.g., transducer assembly 104) may be housed at least partially within the wading staff 400. In some example embodiments, the transducer housing may be waterproof. The sonar transducer 448 may be configured to gather sonar data, e.g. sonar returns, from the underwater environment relative to the wading staff 400. Accordingly, the processor 410 may be configured to receive the sonar returns from the sonar transducer 448, process the sonar returns to generate one or more images including sonar images based on the gathered sonar returns. In this regard, sonar signals, e.g. beams or pulses, from a sonar transducer 448 can be transmitted into the underwater environment. The sonar signals reflect off objects in the underwater environment (e.g. fish, structure, sea floor bottom, etc.) and return to the transducer assembly, which converts the active sonar returns into sonar data that can be used to produce an image of the underwater environment.

Example Flowchart(s) and Operations

Embodiments of the present invention provide methods for operating a wading staff including a sonar transducer. Various examples of the operations performed in accordance with embodiments of the present invention will now be provided with reference to FIG. 6.

Figure 6:
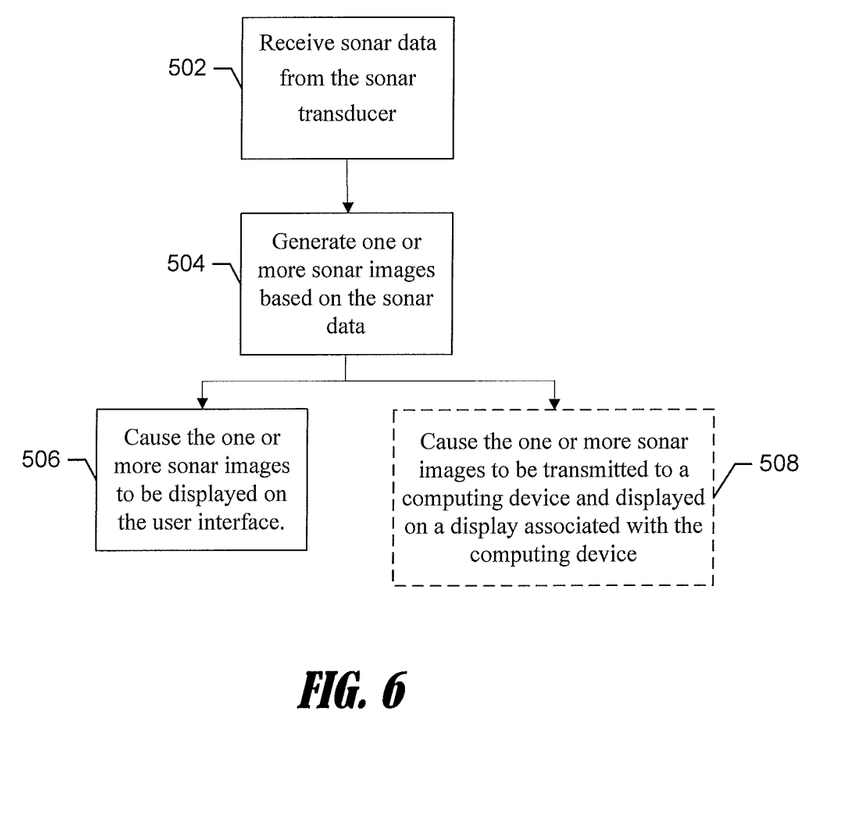
FIG. 6 illustrates a flowchart of an example method for processing marine data and generating a sonar image according to some embodiments discussed herein.

FIG. 6 illustrates a flowchart according to an example method for operating a wading staff including a sonar transducer according to some example embodiments. The operations illustrated in and described with respect to FIG. 6 may, for example, be performed by, with the assistance of, and/or under the control of one or more of the processor 410, 410', memory 420, 420', communication interface 430, 430', user interface 435, 435', location sensor 445, 445', display 440, 440', sonar transducer assembly 448, 448', and/or other sensors 447, 447'.

The method for operating a wading staff including a sonar transducer related data depicted in FIG. 6 may include receiving sonar data from a sonar transducer at operation 502, generating one or more sonar images based on the sonar data at operation 504, and causing the one or more sonar images to be displayed on a user interface at operation 506.

In some embodiments, the method for operating the wading staff including a sonar transducer may include additional, optional operations, and/or the operations described above may be modified or augmented. Some examples of modifications, optional operations, and augmentations are described below, as indicated by dashed lines, such as causing the one or more sonar images to be transmitted to a computing device and displayed on a display associated with the computing device at operation 508.

FIG. 6 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Method of Manufacture

Embodiments of the present invention also provide methods for manufacturing example wading staffs, such as described herein. For example, one or more components of the example wading staffs may be attached together to form one or more wading staffs according to various embodiments described herein.

CONCLUSION

Many modifications and other embodiments of the inventions set forth herein will come to mind to one skilled in the art to which these inventions pertain having the benefit of the teachings presented in the foregoing descriptions and the associated drawings Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A wading staff configured to provide stability for an angler that is standing in a body of water, the wading staff comprising:
a staff portion defining a first end and a second end;
a handle disposed proximate the first end of the staff portion; and
a sonar transducer attached to the staff portion proximate the second end, wherein the sonar transducer is configured to transmit a sonar beam into an underwater environment, wherein the sonar transducer is positioned and oriented within the staff portion such that the sonar transducer is configured to transmit the sonar beam into a portion of the underwater environment when the staff is at least partially submerged.

2. The wading staff of claim 1 further comprising:
a user interface positioned proximate the first end of the staff portion;
a processor; and
a memory including computer program code configured to, when executed by the processor, cause the wading staff to:
receive sonar data from the sonar transducer;
generate one or more sonar images based on the sonar data; and
cause the one or more sonar images to be displayed on the user interface.

3. The wading staff of claim 2, wherein the one or more sonar images comprise two dimensional sonar images.

4. The wading staff of claim 2, wherein the sonar transducer comprises a transducer array configured to transmit a plurality of sonar beams into the underwater environment, and
wherein the one or more sonar images comprise three dimensional sonar images.

5. The wading staff of claim 1 further comprising:
a processor; and
a memory including computer program code configured to, when executed by the processor, cause the wading staff to:
receive sonar data from the sonar transducer;
generate one or more sonar images based on the sonar data; and
cause the one or more sonar images to be transmitted to a remote computing device and displayed on a display associated with the remote computing device.

6. The wading staff of claim 5, wherein the sonar images comprise two dimensional sonar images.

7. The wading staff of claim 5, wherein the sonar transducer comprises a transducer array configured to transmit a plurality of sonar beams into the underwater environment, and
wherein the one or more sonar images comprise three dimensional sonar images.

8. The wading staff of claim 1 further comprising:
one or more environmental sensors disposed in the shaft portion, wherein the one or more environmental sensors are configured to measure one or more environmental conditions of the body of water when the staff is at least partially submerged.

9. The wading staff of claim 1 further comprising:
a tip disposed at the second end of the staff portion and configured to penetrate a bottom surface of the body of water.

10. The wading staff of claim 9 further comprising:
a depth limiter disposed proximate the tip and extending radially from a central axis of the staff portion to prevent the staff from being inserted into the bottom surface past the depth limiter.

11. The wading staff of claim 1 further comprising:
one or more control interfaces disposed on the handle.

12. The wading staff of claim 1, wherein the staff portion comprises a watertight housing with respect to the sonar transducer.

13. The wading staff of claim 1, wherein the sonar transducer is disposed at least partially within the staff portion.

14. The wading staff of claim 1, wherein the sonar transducer is movably attached to the staff portion, wherein the sonar transducer is movable between a first position and a second position along a longitudinal dimension of the staff portion, wherein the longitudinal dimension is defined between the first end and the second end.

15. A wading staff configured to provide stability for an angler that is standing in a body of water, the wading staff comprising:
   a staff portion defining a first end and a second end;
   a handle disposed proximate the first end of the staff portion;
   a sonar transducer at least one of attached to or disposed at least partially within the staff portion, wherein the sonar transducer is configured to transmit a sonar beam into an underwater environment, wherein the sonar transducer is positioned and oriented within the staff portion such that the sonar transducer is configured to transmit the sonar beam into a portion of the underwater environment when the staff is at least partially submerged;
   a user interface positioned proximate the first end of the staff portion;
   a processor; and
   a memory including computer program code configured to, when executed by the processor, cause the wading staff to:
      receive sonar data from the sonar transducer;
      generate one or more sonar images based on the sonar data; and
      cause the one or more sonar images to be displayed on the user interface.

16. The wading staff of claim 15, wherein the one or more sonar images comprise two dimensional sonar images.

17. The wading staff of claim 15, wherein the sonar transducer comprises a transducer array configured to transmit a plurality of sonar beams into the underwater environment, and
   wherein the one or more sonar images comprise three dimensional sonar images.

18. The wading staff of claim 15, wherein the sonar transducer is movable between a first position and a second position along a longitudinal dimension of the staff portion, wherein the longitudinal dimension is defined between the first end and the second end.

19. A method for manufacturing a wading staff configured to provide stability for an angler that is standing in a body of water, the method comprising:
   providing a staff portion defining a first end and a second end;
   attaching a handle to the staff portion proximate the first end of the staff portion;
   attaching a sonar transducer to the staff portion, wherein the sonar transducer is configured to transmit a sonar beam into an underwater environment, wherein the sonar transducer is positioned and oriented within the staff portion such that the sonar transducer is configured to transmit the sonar beam into a portion of the underwater environment when the staff is at least partially submerged;
   attaching a user interface to the staff portion proximate the first end of the staff portion;
   installing a processor within the staff portion; and
   installing a memory within the staff portion, wherein the memory includes computer program code configured to, when executed by the processor, cause the wading staff to:
      receive sonar data from the sonar transducer;
      generate one or more sonar images based on the sonar data; and
      cause the one or more sonar images to be displayed on the user interface.

20. The method of claim 19 further comprising:
   installing one or more environmental sensors within the shaft portion, wherein the one or more environmental sensors are configured to measure one or more environmental conditions of the body of water when the staff is at least partially submerged.

* * * * *